United States Patent
Jha

(10) Patent No.: US 10,353,619 B1
(45) Date of Patent: Jul. 16, 2019

(54) SYSTEMS AND METHODS FOR APPLYING STORAGE LIFECYCLE POLICIES TO BACKUPS

(75) Inventor: Mohit Jha, Maharashtra (IN)

(73) Assignee: Veritas Technologies LLC, Santa Clara, CA (US)

( * ) Notice: Subject to any disclaimer, the term of this patent is extended or adjusted under 35 U.S.C. 154(b) by 171 days.

(21) Appl. No.: 13/493,474

(22) Filed: Jun. 11, 2012

(51) Int. Cl.
- *G06F 3/06* (2006.01)
- *G06F 11/14* (2006.01)
- *G06F 16/11* (2019.01)
- *G06F 16/185* (2019.01)

(52) U.S. Cl.
CPC ........ *G06F 3/0649* (2013.01); *G06F 11/1448* (2013.01); *G06F 16/113* (2019.01); *G06F 16/122* (2019.01); *G06F 16/125* (2019.01); *G06F 16/185* (2019.01)

(58) Field of Classification Search
None
See application file for complete search history.

(56) References Cited

U.S. PATENT DOCUMENTS

| | | | |
|---|---|---|---|
| 8,234,640 B1* | 7/2012 | Fitzgerald | G06F 21/53 718/1 |
| 2006/0004868 A1* | 1/2006 | Claudatos et al. | 707/104.1 |
| 2007/0180439 A1* | 8/2007 | Sundararajan et al. | 717/158 |
| 2007/0244938 A1* | 10/2007 | Michael et al. | 707/204 |
| 2009/0313447 A1* | 12/2009 | Nguyen | G06F 11/1451 711/162 |
| 2010/0050231 A1* | 2/2010 | Kilday | G06Q 10/107 726/1 |
| 2010/0070725 A1* | 3/2010 | Prahlad et al. | 711/162 |
| 2010/0138829 A1* | 6/2010 | Hanquez et al. | 718/1 |
| 2011/0161301 A1* | 6/2011 | Pratt | G06F 3/0619 707/661 |
| 2012/0109958 A1* | 5/2012 | Thakur | G06F 17/30082 707/737 |
| 2013/0166521 A1* | 6/2013 | Ghatty | G06F 11/1469 707/695 |
| 2013/0219176 A1* | 8/2013 | Akella | H04L 63/0815 713/165 |

* cited by examiner

*Primary Examiner* — David T. Brooks
(74) *Attorney, Agent, or Firm* — FisherBroyles, LLP

(57) ABSTRACT

A computer-implemented method for applying storage lifecycle policies to backups may include 1) identifying a backup of a storage container that includes data for a virtual machine, 2) identifying at least one application that executes within the virtual machine in response to identifying the backup of the storage container, 3) identifying a storage lifecycle policy configured to apply to the application based on identifying the application within the virtual machine, and 4) applying the storage lifecycle policy to the backup of the storage container based on identifying the application within the virtual machine. Various other methods, systems, and computer-readable media are also disclosed.

20 Claims, 6 Drawing Sheets

SYSTEMS AND METHODS FOR APPLYING STORAGE LIFECYCLE POLICIES TO BACKUPS

BACKGROUND

In the digital age, organizations increasingly rely on digitally-stored data. To protect against data loss, an organization may use a backup system to back up important data. In some cases, an organization may handle and store data via virtual machines. Accordingly, a backup system may back up a virtual machine disk image to preserve data handled by a virtual machine.

Due to increasingly complex information technology infrastructures, an organization may wish to apply differing storage lifecycle policies to various backups. Traditionally, backup administrators charged with creating backups of physical servers have manually configured backup jobs, assigning storage lifecycle policies to each backup job as appropriate. With the proliferation of virtual machines, many backup administrators may configure backup jobs to protect containers for virtual machines. As virtual machines dynamically exit and/or enter these containers, traditional lifecycle management approaches for virtual machine data may fail to account for what type of data is stored by each virtual machine. Accordingly, the instant disclosure identifies additional and improved systems and methods for applying storage lifecycle policies to backups.

SUMMARY

As will be described in greater detail below, the instant disclosure generally relates to systems and methods for applying storage lifecycle policies to backups by selecting storage lifecycle policies to apply to backups of containers based on what applications run within virtual machines within the containers. In one example, a computer-implemented method for applying storage lifecycle policies to backups may include 1) identifying a backup of a storage container that includes data for a virtual machine, 2) identifying at least one application that executes within the virtual machine in response to identifying the backup of the storage container, 3) identifying a storage lifecycle policy configured to apply to the application based on identifying the application within the virtual machine, and 4) applying the storage lifecycle policy to the backup of the storage container based on identifying the application within the virtual machine.

In some examples, an additional virtual machine may have previously stored additional data within the storage container before the virtual machine was configured to store data within the storage container.

In some embodiments, identifying the application that executes within the virtual machine may include identifying a plurality of applications that execute within the virtual machine. In these embodiments, the computer-implemented method may also include 1) identifying an application order of precedence for storage lifecycle policies and 2) determining that the application has a highest precedence within the plurality of applications based on the application order of precedence. In these embodiments, identifying the storage lifecycle policy may be based on determining that the application has the highest precedence.

In one example, identifying the application may include 1) querying an agent within the virtual machine in response to identifying the backup of the storage container and 2) receiving a communication from the agent within the virtual machine that identifies the application in response to querying the agent.

In some embodiments, identifying the storage lifecycle policy may include 1) identifying a database associating a plurality of storage lifecycle policies with a plurality of applications, 2) querying the database with the application, and 3) receiving the storage lifecycle policy from the database in response to querying the database.

In some examples, applying the storage lifecycle policy to the backup may include determining a storage destination of the backup. Additionally or alternatively, applying the storage lifecycle policy to the backup may include configuring a retention schedule for the backup. In various examples, applying the storage lifecycle policy to the backup may include configuring the backup for archival, replication, compression, and/or encryption.

In one embodiment, a system for implementing the above-described method may include 1) an identification module programmed to identify a backup of a storage container that comprises data for a virtual machine, 2) a classification module programmed to identify at least one application that executes within the virtual machine in response to identifying the backup of the storage container, 3) a policy module programmed to identify a storage lifecycle policy configured to apply to the application based on identifying the application within the virtual machine, and 4) an application module programmed to apply the storage lifecycle policy to the backup of the storage container based on identifying the application within the virtual machine. The system may also include at least one processor configured to execute the identification module, the classification module, the policy module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a backup of a storage container that includes data for a virtual machine, 2) identify at least one application that executes within the virtual machine in response to identifying the backup of the storage container, 3) identify a storage lifecycle policy configured to apply to the application based on identifying the application within the virtual machine, and 4) apply the storage lifecycle policy to the backup of the storage container based on identifying the application within the virtual machine.

As will be explained in greater detail below, by selecting storage lifecycle policies to apply to backups of containers based on what applications run within virtual machines within the containers, the systems and methods described herein may account for the type of data stored by virtual machines (e.g., based on the applications operating within the virtual machines) when applying storage lifecycle policies. Accordingly, these systems and methods may dynamically apply storage lifecycle policies, providing a practical approach for applying differentiated data-based storage lifecycle policies to virtual computing infrastructures (e.g., by automatically selecting the correct policy for each container based on current applications within current virtual machines within the containers).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
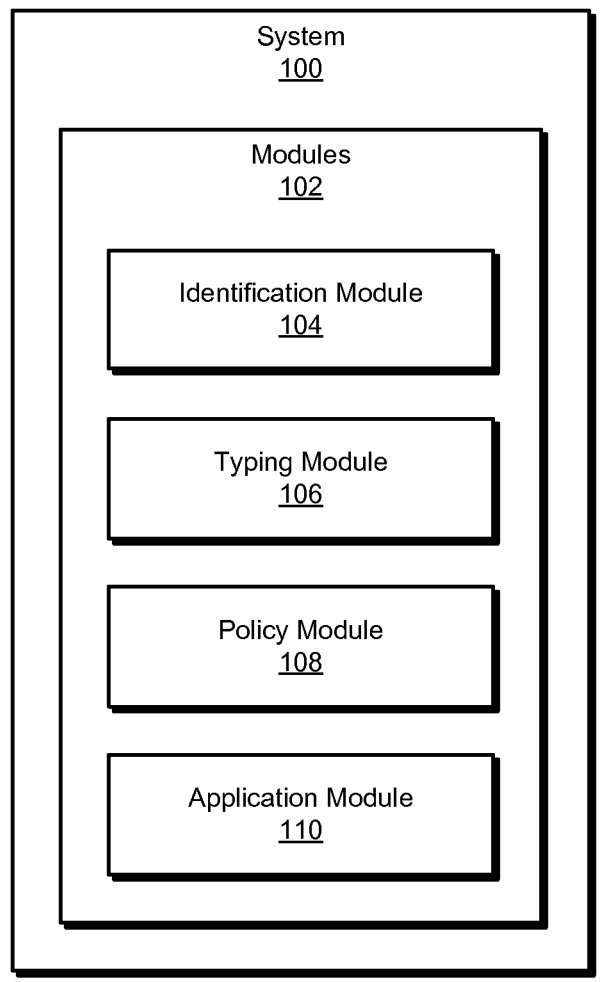
FIG. 1 is a block diagram of an exemplary system for applying storage lifecycle policies to backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
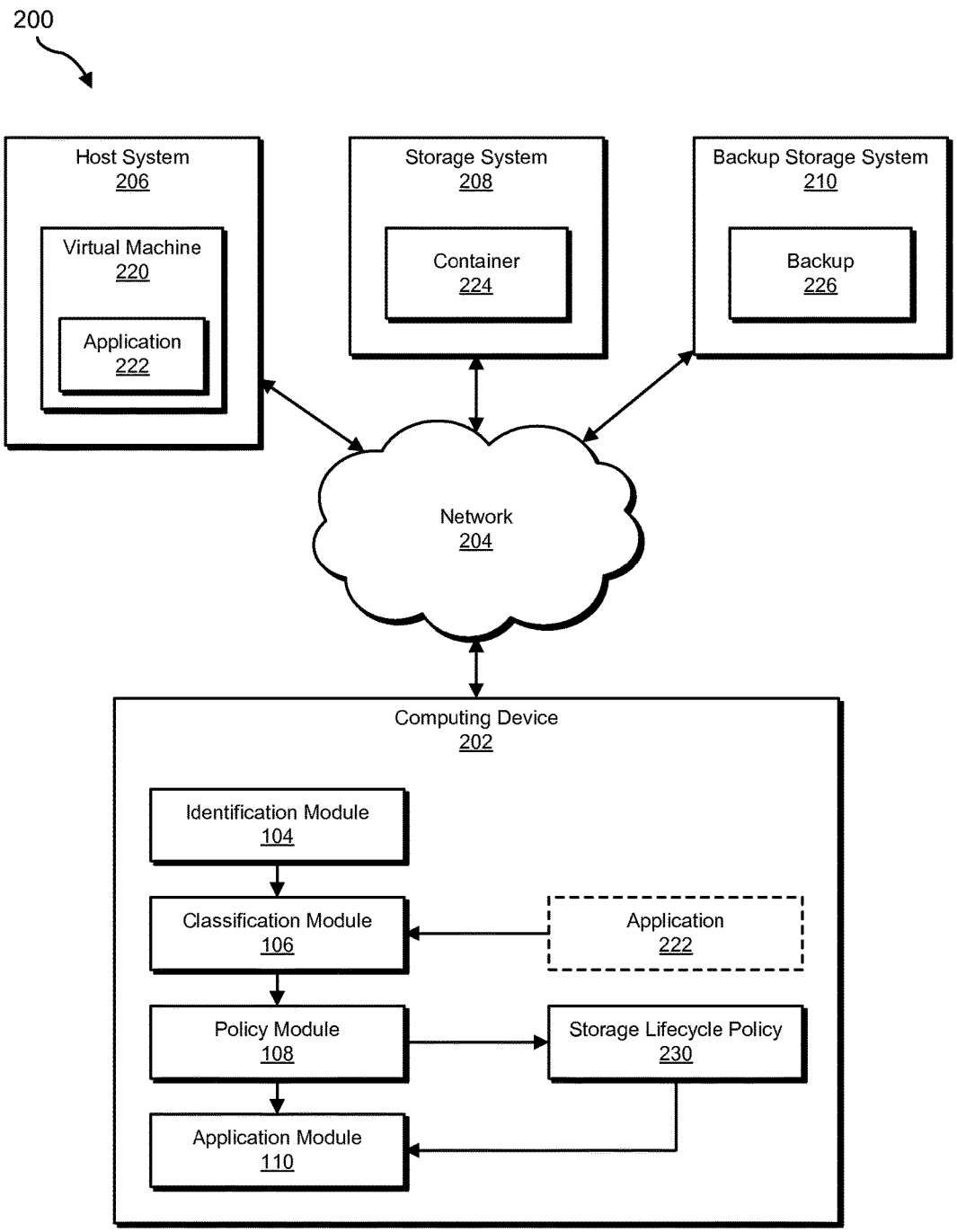
FIG. 2 is a block diagram of an exemplary system for applying storage lifecycle policies to backups.
Figure 3:
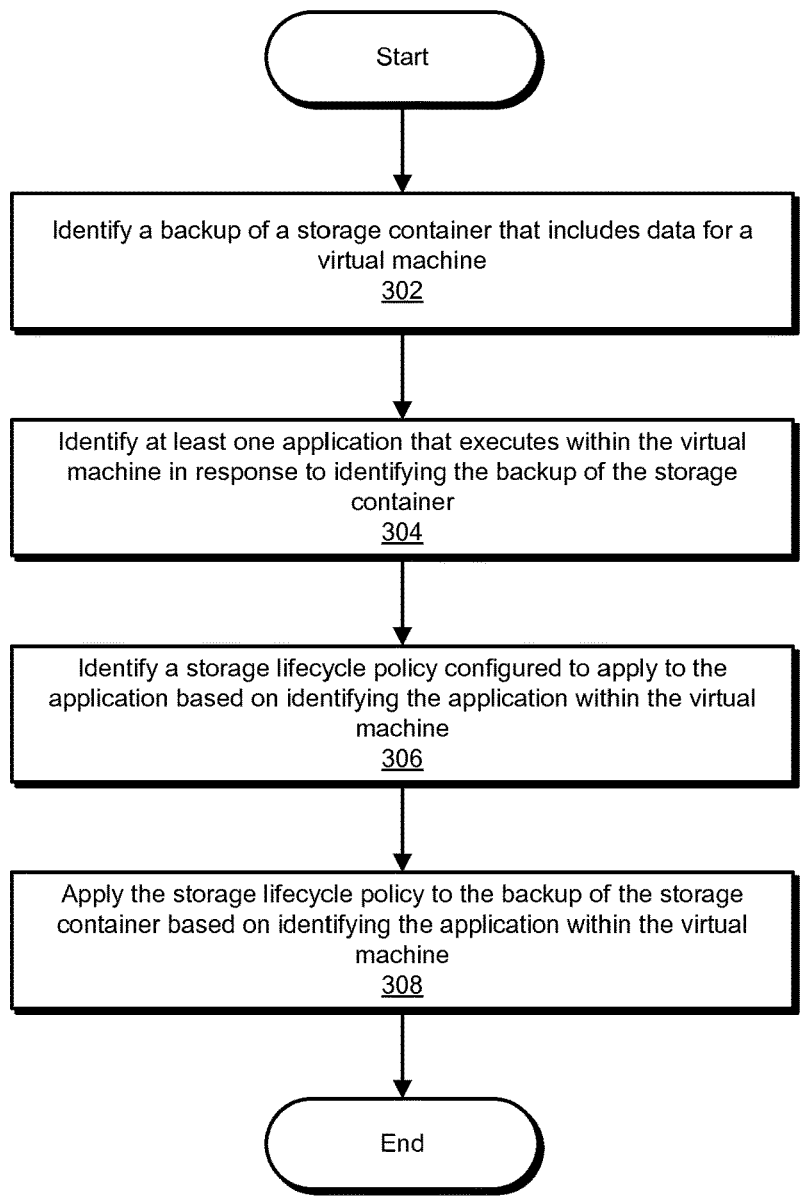
FIG. 3 is a flow diagram of an exemplary method for applying storage lifecycle policies to backups.
Figure 4:
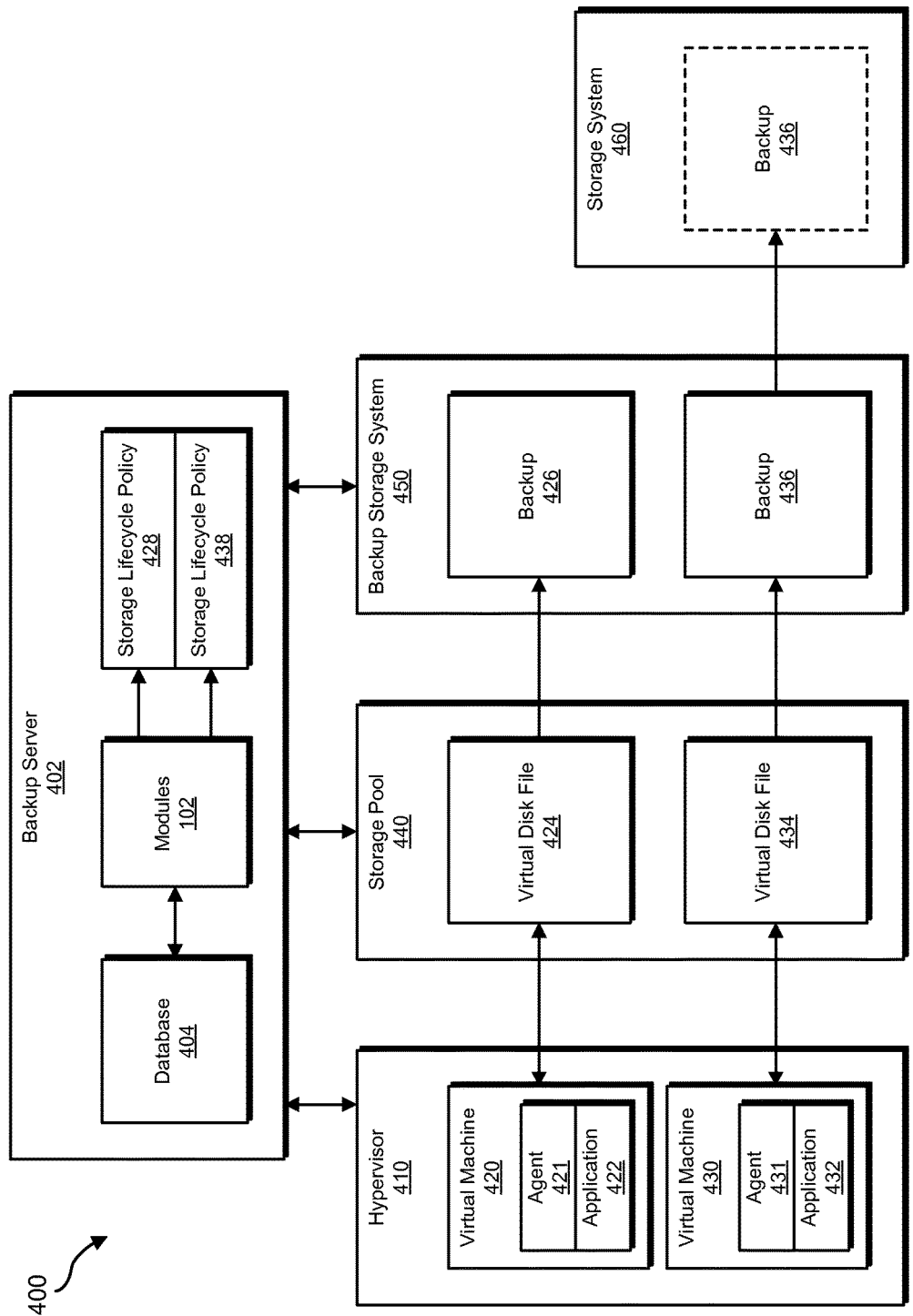
FIG. 4 is a block diagram of an exemplary system for applying storage lifecycle policies to backups.

The following will provide, with reference to FIGS. 1, 2, and 4, detailed descriptions of exemplary systems for applying storage lifecycle policies to backups. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for applying storage lifecycle policies to backups. As illustrated in this figure, exemplary system 100 may include one or more modules 102 for performing one or more tasks. For example, and as will be explained in greater detail below, exemplary system 100 may include an identification module 104 programmed to identify a backup of a storage container that comprises data for a virtual machine. Exemplary system 100 may also include a classification module 106 programmed to identify at least one application that executes within the virtual machine in response to identifying the backup of the storage container.

In addition, and as will be described in greater detail below, exemplary system 100 may include a policy module 108 programmed to identify a storage lifecycle policy configured to apply to the application based on identifying the application within the virtual machine. Exemplary system 100 may also include an application module 110 programmed to apply the storage lifecycle policy to the backup of the storage container based on identifying the application within the virtual machine. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, host system 206, storage system 208, and/or backup storage system 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a host system 206, a storage system 208, and/or a backup storage system 210 via a network 204. For example, computing device 202 may be configured to manage storage lifecycle policies for one or more backups (e.g., a backup 226) of one or more containers (e.g., a container 224) of virtual machines (e.g., a virtual machine 220).

In one embodiment, one or more of modules 102 from FIG. 1 may, when executed by at least one processor of computing device 202, facilitate computing device 202 in applying storage lifecycle policies to backups. For example, and as will be described in greater detail below, one or more of modules 102 may cause computing device 202 to 1) identify backup 226 of storage container 224 that includes data for virtual machine 220, 2) identify an application 222 that executes within virtual machine 220 in response to identifying backup 226 of container 224, 3) identify a storage lifecycle policy 230 configured to apply to application 222 based on identifying application 222 within virtual machine 220, and 4) apply storage lifecycle policy 230 to backup 226 of container 224 based on identifying application 222 within virtual machine 220.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Host system 206 generally represents any type or form of computing device that is capable of hosting and/or executing a virtual machine. Examples of host system 206 include, without limitation, hypervisors and computing devices configured to execute hypervisors and/or virtual machine hosting software.

Storage system 208 may represent portions of a single database or storage device or a plurality of databases or storage devices. For example, storage system 208 may represent a portion of computing system 510 in FIG. 5 and/or portions of exemplary network architecture 600 in FIG. 6. Alternatively, storage system 208 in FIG. 1 may represent one or more physically separate devices capable of being accessed by a computing device, such as host system

Figure 5:
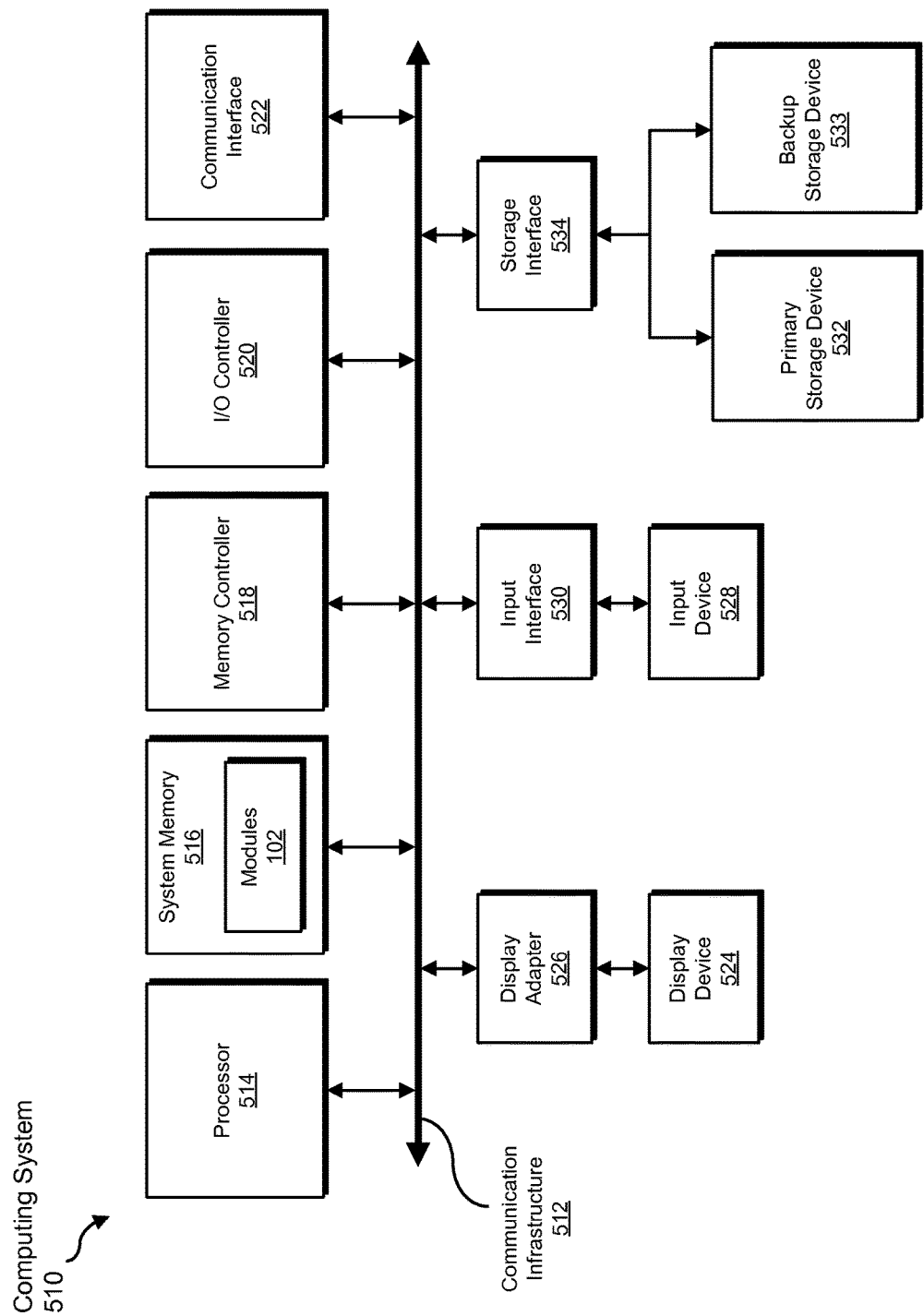
FIG. 5 is a block diagram of an exemplary computing system capable of implementing one or more of the embodiments described and/or illustrated herein.
Figure 6:
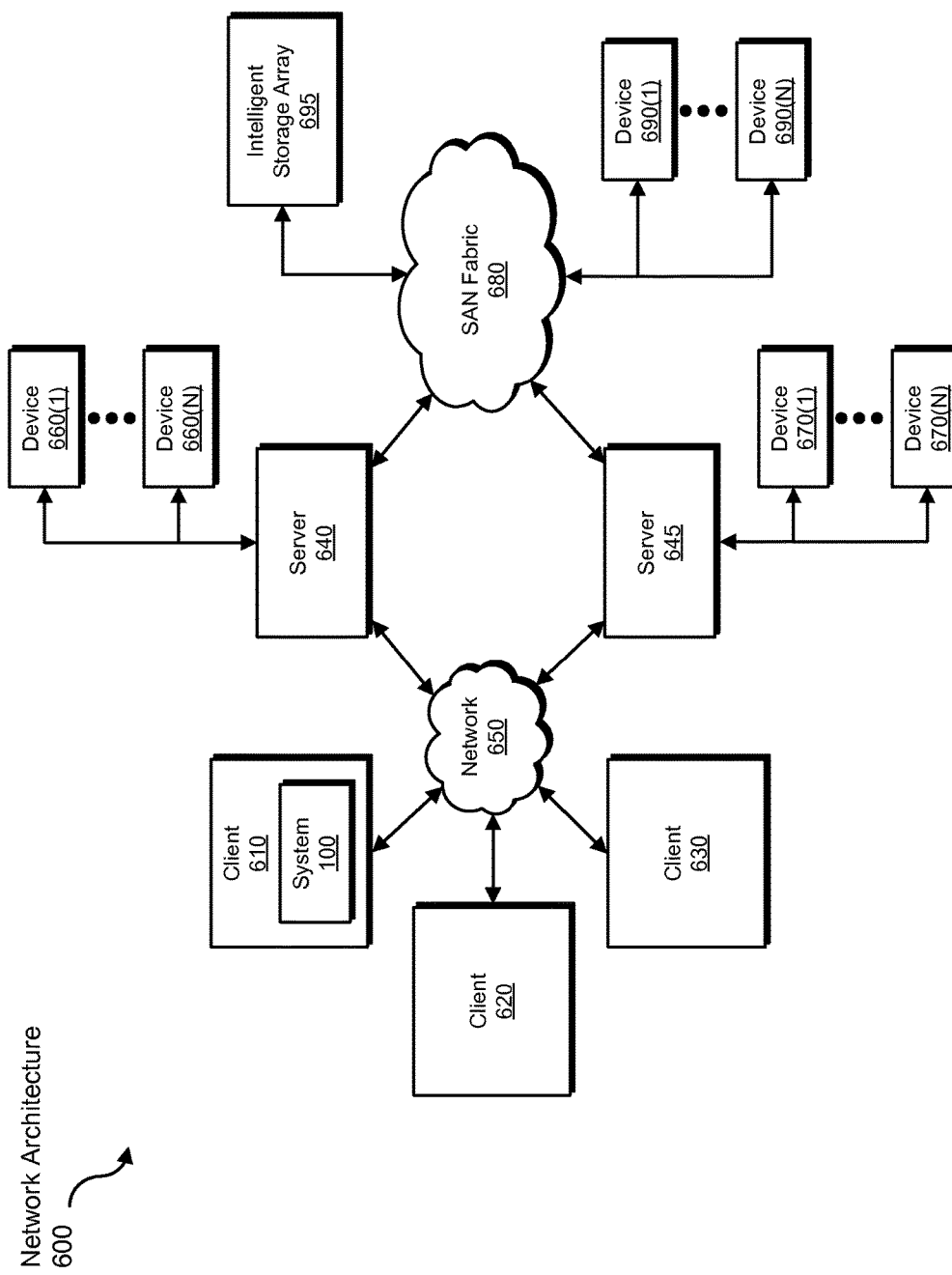
FIG. 6 is a block diagram of an exemplary computing network capable of implementing one or more of the embodiments described and/or illustrated herein.

206 in FIG. 2, computing system 510 in FIG. 5, and/or portions of exemplary network architecture 600 in FIG. 6.

Backup storage system 210 may represent portions of a single database or storage device or a plurality of databases or storage devices. For example, backup storage system 210 may represent a portion of computing system 510 in FIG. 5 and/or portions of exemplary network architecture 600 in FIG. 6. Alternatively, Backup storage system 210 in FIG. 1 may represent one or more physically separate devices capable of being accessed by a computing device, such as computing system 202 in FIG. 2, computing system 510 in FIG. 5, and/or portions of exemplary network architecture 600 in FIG. 6.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for applying storage lifecycle policies to backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a backup of a storage container that includes data for a virtual machine. For example, at step 302 identification module 104 may, as part of computing device 202 in FIG. 2, identify backup 226 of storage container 224 that includes data for virtual machine 220.

As used herein, the term "backup" may refer to any procedure (configured, scheduled, in progress, and/or completed) to backup, duplicate, and/or protect data and/or the results of any such procedure. As used herein, the phrase "storage container" may refer to any container that includes and/or corresponds to data for a virtual machine. In some examples, storage containers may contain virtual machines interchangeably. For example, one virtual machine may be removed from a storage container and another virtual machine may be added to the storage container.

In some examples, the storage container may have previously included data for an additional virtual machine. For example, the additional virtual machine previously stored additional data within the storage container before the virtual machine was configured to store data within the storage container. Nevertheless, as will be explained in greater detail below, the systems and methods described herein may apply the storage lifecycle policy to the backup of the storage container based on the virtual machine (e.g., instead of the additional virtual machine), thereby dynamically and meaningfully applying storage lifecycle policies based on application data (and, e.g., decreasing and/or removing an administrator burden of manually assigning storage lifecycle policies to backups).

As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

FIG. 4 illustrates an exemplary system 400 for applying lifecycle storage policies to backups. As shown in FIG. 4, exemplary system 400 may include a backup server 402, a hypervisor 410, a storage pool 440, a backup storage system 450, and a storage system 460. Using FIG. 4 as an example, at step 302 identification module 104 may, as a part of backup server 402, identify a backup 426 of a virtual disk file 424 of a virtual machine 420.

Returning to FIG. 3, at step 304 one or more of the systems described herein may identify at least one application that executes within the virtual machine in response to identifying the backup of the storage container. For example, at step 304 classification module 106 may, as part of computing device 202 in FIG. 2, identify backup 226 of storage container 224 that includes data for virtual machine 220.

As used herein, the term "application" may refer to any application, program, module, script, and/or process capable of executing within a virtual machine. In some examples, the term "application" may refer to a primary and/or production application within a virtual machine. Examples of applications include, without limitation, database servers (e.g., MYSQL), e-mail servers (e.g., MICROSOFT EXCHANGE SERVER), web servers (e.g., APACHE HTTP SERVER), etc.

Classification module 106 may identify the application within the virtual machine in any of a variety of ways. For example, classification module 106 may identify the application by identifying an instance of the application in execution within the virtual machine. Additionally or alternatively, classification module 106 may identify the application by identifying data stored by the application within the virtual machine. In some examples, classification module 106 may identify the application by identifying a system configuration and/or registry indicating the presence of the application within the virtual machine. In some examples, classification module 106 may identify the application by receiving a message identifying the application. For example, classification module 106 may query an agent within the virtual machine (e.g., in response to identifying the backup of the storage container. Classification module 106 may then receive a communication from the agent within the virtual machine that identifies the application in response to querying the agent. As used herein, the term "agent" may refer to any program, module, daemon, script, and/or process capable of executing within a virtual machine and receiving and/or sending communications outside the virtual machine.

In some examples, classification module 106 may identify the application by identifying precise application identification information that uniquely identifies the application (and, in some examples, the version of the application). Additionally or alternatively, classification module 106 may identify a type of the application (e.g., classification module 106 may identify the application simply as a "database server," an "email server," etc.).

Classification module 106 may distinguish the application in any of a variety of ways. For example, classification module 106 may identify the application by identifying a list of applications of interest and searching the virtual machine for one or more applications present on the list. In some examples, classification module 106 may identify a plurality of applications that execute within the virtual machine. In these examples, classification module 106 may identify an application order of precedence for storage lifecycle policies. For example, an administrator may create define the application order of precedence as a configuration option. Classification module 106 may then determine that the application has a highest precedence within the plurality of applications based on the application order of precedence. Classification module 106 may therefore select the application from the plurality of applications.

Using FIG. 4 as an example, at step 304 classification module 106 may identify an application 422 within virtual machine 420 (e.g., by querying an agent 421 within virtual machine 420 for applications of interest executing within virtual machine 420).

Returning to FIG. 3, at step 306 one or more of the systems described herein may identify a storage lifecycle policy configured to apply to the application based on identifying the application within the virtual machine. For example, at step 306 policy module 108 may, as part of computing device 202 in FIG. 2, identify storage lifecycle policy 230 configured to apply to application 222 based on identifying application 222 within virtual machine 220.

As used herein, the phrase "storage lifecycle policy" may refer to any policy, configuration, setting, and/or rule applicable to backup data for determining one or more conditions under which the backup data is stored. For example, a storage lifecycle policy may determine the storage location of backup data, the retention and/or expiry of backup data, the archival of backup data, the replication of backup data, the compression of backup data, the encryption of backup data, etc.

Policy module 108 may identify the storage lifecycle policy in any suitable manner. For example, policy module 108 may identify the storage lifecycle policy by 1) identifying a database associating a plurality of storage lifecycle policies with a plurality of applications, 2) querying the database with the application, and 3) receiving the storage lifecycle policy from the database in response to querying the database. For example, the database may specify a storage lifecycle policy for e-mail server data specifying one year of retention and encryption. In another example, the database may specify a storage lifecycle policy for database server data specifying five years of retention and compression.

As mentioned earlier, in some examples one or more of the systems described herein may identify a plurality of applications that execute within the virtual machine and may therefore identify an application order of precedence for storage lifecycle policies and select the application with highest precedence. In these examples, policy module 108 may identifying the storage lifecycle policy based on determining that the application has the highest precedence. Additionally or alternatively, policy module 108 may identify the storage lifecycle policy by dynamically generating a policy that meets all of the storage lifecycle requirements of each of the plurality of applications. For example, policy module 108 may identify a list of storage lifecycle rules relating to retention requirements, replication requirements, compression requirements, encryption requirements, storage location requirements, etc., for each application within the plurality of applications. Policy module 108 may then generate a storage lifecycle policy using the strictest requirements for each rule (e.g., the longest required retention period of all the applications within the plurality of applications, requiring replication if any of the applications have an associated rule for replication, etc.).

Using FIG. 4 as an example, at step 306 policy module 108 may identify a storage lifecycle policy 428 for backup 426 by querying a database 404 with an identifier of application 422 and receiving storage lifecycle policy 428 in response.

Returning to FIG. 3, at step 308 one or more of the systems described herein may apply the storage lifecycle policy to the backup of the storage container based on identifying the application within the virtual machine. For example, at step 308 application module 110 may, as part of computing device 202 in FIG. 2, apply storage lifecycle policy 230 to backup 226 of container 224 based on identifying application 222 within virtual machine 220.

Application module 110 may apply any of a variety of conditions to the backup as specified by the storage lifecycle policy. For example, application module 110 may determine a storage destination of the backup. For example, application module 110 may determine that the storage lifecycle policy requires that the backup be stored within specified geographic boundaries (e.g., within the boundaries of a country). Additionally or alternatively, application module 110 may determine that the storage lifecycle policy requires that the backup be stored on a storage device with a specified level of reliability.

In some examples, application module 110 may configure a retention schedule for the backup. For example, application module 110 may configure the backup to be retained for one year. As another example, application module 110 may configure the backup to be retained for at least two years and to be retained thereafter until a request to reclaim the space used by the backup. In an additional example, application module 110 may configure the backup to be retained until another backup of the virtual machine is created.

Application module 110 may also configure the backup for one or more additional operations as specified by the storage lifecycle policy. For example, application module 110 may configure the backup for archival to lower-cost and lower-performance storage. As another example, application module 110 may configure the backup for replication (e.g., to another site). In some examples, application module 110 may configure the backup for compression (e.g., to a specified level of compression). Additionally or alternatively, application module 110 may configure the backup for encryption (e.g., to a specified standard of encryption). In some examples, application module 110 may configure the backup for compression and/or encryption by compressing and/or encrypting the backup. Additionally or alternatively, application module 110 may configure the backup for compression and/or encryption by designating the backup to be stored on a storage device with native compression and/or encryption capabilities.

Using FIG. 4 as an example, at step 308 application module 110 may, as a part of backup server 402, apply storage lifecycle policy 428 to backup 426 (based on backup 426 representing a backup of virtual disk file 424 storing data for virtual machine 420 running application 422). Additionally, application module 110 may, as a part of backup server 402, apply a different storage lifecycle policy 438 to a backup 436 (based on backup 436 representing a backup of a virtual disk file 434 storing data for a virtual machine 430 running an application 432 as reported by an agent 431). In one example, storage lifecycle policy 438 may include a rule for replicating backup 436 to storage system 460, while storage lifecycle policy 428 may not include a rule for replicating backup 426.

As explained above, by selecting storage lifecycle policies to apply to backups of containers based on what applications run within virtual machines within the containers, the systems and methods described herein may account for the type of data stored by virtual machines (e.g., based on the applications operating within the virtual machines) when applying storage lifecycle policies. Accordingly, these systems and methods may dynamically apply storage lifecycle policies, providing a practical approach for applying differentiated data-based storage lifecycle policies to virtual computing infrastructures (e.g., by automatically selecting the correct policy for each container based on current applications within current virtual machines within the containers).

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, querying, receiving, determining, and configuring steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510.

Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, querying, receiving, determining, and configuring steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for applying storage lifecycle policies to backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for applying storage lifecycle policies to backups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for applying storage lifecycle policies to backups, at least a portion of the method being performed by a computing device comprising at least one processor, the method comprising:
    identifying a virtual machine that connects to a virtual disk file to store data to the virtual disk file;
    identifying, at a first point in time, a backup copy of the virtual disk file;
    querying, at a second point in time subsequent to the first point in time, an agent within the virtual machine in response to identifying the backup copy of the virtual disk file;
    receiving, in response to querying the agent, a communication from the agent within the virtual machine that indicates that the agent identified a plurality of applications that execute within the virtual machine;
    identifying a storage lifecycle policy configured to apply to the plurality of applications based on the agent having identified the plurality of applications that execute within the virtual machine by dynamically generating, at least in part by identifying a list of storage lifecycle rules for each application within the plurality of applications, the storage lifecycle policy such that the storage lifecycle policy meets all storage lifecycle requirements of each of the plurality of applications;
    applying the storage lifecycle policy to the backup copy of the virtual disk file based on the agent having identified the plurality of applications that execute within the virtual machine.

2. The computer-implemented method of claim 1, wherein the list of storage lifecycle rules relate to at least one of:
    retention requirements;
    replication requirements;
    compression requirements;
    encryption requirements;
    storage location requirements.

3. The computer-implemented method of claim 2, wherein the list of storage lifecycle rules relate to the retention requirements.

4. The computer-implemented method of claim 1, wherein dynamically generating the storage lifecycle policy comprises using the strictest requirement for each rule.

5. The computer-implemented method of claim 1, wherein applying the storage lifecycle policy to the backup copy comprises configuring the backup copy for at least one of:
   archival;
   replication;
   compression;
   encryption.

6. The computer-implemented method of claim 1, wherein:
   an additional virtual machine previously connected to the virtual disk file to store data to the virtual disk file before the virtual machine connected to the virtual disk file to store data within the virtual disk file;
   applying the storage lifecycle policy to the backup copy of the virtual disk file based on the agent having identified the plurality of applications that execute within the virtual machine comprises dynamically applying the storage lifecycle policy by applying the storage lifecycle policy based on the virtual machine instead of based on the additional virtual machine previously connected to the virtual disk file.

7. The computer-implemented method of claim 1, wherein identifying the storage lifecycle policy comprises:
   identifying a database associating a plurality of storage lifecycle policies with the plurality of applications;
   querying the database with an application from the plurality of applications;
   receiving the storage lifecycle policy from the database in response to querying the database.

8. A system for applying storage lifecycle policies to backups, the system comprising:
   an identification module programmed to:
      identify a virtual machine that connects to a virtual disk file to store data to the virtual disk file;
      identify, at a first point in time, a backup copy of the virtual disk file;
   a classification module programmed to:
      query, at a second point in time subsequent to the first point in time, an agent within the virtual machine in response to identifying the backup copy of the virtual disk file;
      receive, in response to querying the agent, a communication from the agent within the virtual machine that indicates that the agent identified a plurality of applications that execute within the virtual machine;
   a policy module programmed to identify a storage lifecycle policy configured to apply to the plurality of applications based on the agent having identified the plurality of applications that execute within the virtual machine by dynamically generating, at least in part by identifying a list of storage lifecycle rules for each application within the plurality of applications, the storage lifecycle policy such that the storage lifecycle policy meets all storage lifecycle requirements of each of the plurality of applications;
   an application module programmed to apply the storage lifecycle policy to the backup copy of the virtual disk file based on the agent having identified the plurality of applications that execute within the virtual machine;
   at least one hardware processor configured to execute the identification module, the classification module, the policy module, and the application module.

9. The system of claim 8, wherein the list of storage lifecycle rules relate to at least one of:
   retention requirements;
   replication requirements;
   compression requirements;
   encryption requirements;
   storage location requirements.

10. The system of claim 8, wherein the application module is programmed to apply the storage lifecycle policy to the backup copy by determining a storage destination of the backup copy.

11. The system of claim 8, wherein the application module is programmed to apply the storage lifecycle policy to the backup copy by configuring a retention schedule for the backup copy.

12. The system of claim 8, wherein the application module is programmed to apply the storage lifecycle policy to the backup copy by configuring the backup copy for at least one of:
   archival;
   replication;
   compression;
   encryption.

13. The system of claim 9, wherein the list of storage lifecycle rules relate to the retention requirements.

14. The system of claim 8, wherein the policy module is programmed to identify the storage lifecycle policy by:
   identifying a database associating a plurality of storage lifecycle policies with the plurality of applications;
   querying the database with an application from the plurality of applications;
   receiving the storage lifecycle policy from the database in response to querying the database.

15. A non-transitory computer-readable-storage medium comprising one or more computer-executable instructions that, when executed by at least one processor of a computing device, cause the computing device to:
   identify a virtual machine that connects to a virtual disk file to store data to the virtual disk file;
   identify, at a first point in time, a backup copy of the virtual disk file;
   query, at a second point in time subsequent to the first point in time, an agent within the virtual machine in response to identifying the backup copy of the virtual disk file;
   receive, in response to querying the agent, a communication from the agent within the virtual machine that indicates that the agent identified a plurality of applications that execute within the virtual machine;
   identify a storage lifecycle policy configured to apply to the plurality of applications based on the agent having identified the plurality of applications that execute within the virtual machine by dynamically generating, at least in part by identifying a list of storage lifecycle rules for each application within the plurality of applications, the storage lifecycle policy such that the storage lifecycle policy meets all storage lifecycle requirements of each of the plurality of applications;
   apply the storage lifecycle policy to the backup copy of the virtual disk file based on the agent having identified the plurality of applications that execute within the virtual machine.

16. The computer-readable-storage medium of claim 15, wherein the list of storage lifecycle rules relate to at least one of:
   retention requirements;
   replication requirements;

compression requirements;
encryption requirements;
storage location requirements.

17. The computer-readable-storage medium of claim 15, wherein the one or more computer-executable instructions cause the computing device to apply the storage lifecycle policy to the backup copy by causing the computing device to determine a storage destination of the backup copy.

18. The computer-readable-storage medium of claim 15, wherein the one or more computer-executable instructions cause the computing device to apply the storage lifecycle policy to the backup copy by causing the computing device to configure a retention schedule for the backup copy.

19. The computer-readable-storage medium of claim 15, wherein applying the storage lifecycle policy to the backup copy comprises configuring the backup copy for at least one of:
   archival;
   replication;
   compression;
   encryption.

20. The computer-readable-storage medium of claim 16, wherein the list of storage lifecycle rules relate to the retention requirements.

\* \* \* \* \*